United States Patent
Yamashita et al.

(10) Patent No.: US 9,624,647 B2
(45) Date of Patent: Apr. 18, 2017

(54) SLEWING-TYPE WORKING MACHINE (75) Inventors: Koji Yamashita, Hiroshima (JP);
Masayuki Komiyama, Hiroshima (JP);
Kazushige Koiwai, Hiroshima (JP);
Koji Ueda, Hiroshima (JP); Kengo Maeda, Kobe (JP)

(73) Assignees: KOBELCO CONSTRUCTION MACHINERY CO., LTD., Hiroshima-shi (JP); Kobe Steel, Ltd., Kobe-shi (JP)

( * ) Notice: Subject to any disclaimer, the term of this patent is extended or adjusted under 35 U.S.C. 154(b) by 574 days.

(21) Appl. No.: 14/115,282

(22) PCT Filed: May 11, 2012

(86) PCT No.: PCT/JP2012/003095
§ 371 (c)(1),
(2), (4) Date: Nov. 1, 2013

(87) PCT Pub. No.: WO2012/160770
PCT Pub. Date: Nov. 29, 2012

(65) Prior Publication Data
US 2014/0166135 A1    Jun. 19, 2014

(30) Foreign Application Priority Data

May 25, 2011 (JP) .................................. 2011-116870

(51) Int. Cl.
*F16D 31/02* (2006.01)
*E02F 9/22* (2006.01)
(Continued)

(52) U.S. Cl.
CPC ............ *E02F 9/2296* (2013.01); *E02F 9/123* (2013.01); *E02F 9/2235* (2013.01);
(Continued)

(58) Field of Classification Search
CPC ...... F15B 9/04; F15B 9/03; F15B 9/14; E02F 9/123
(Continued)

(56) References Cited

U.S. PATENT DOCUMENTS 3,999,387 A * 12/1976 Knopf ................. F16H 61/4139
60/444
5,931,078 A    8/1999 Kropp
(Continued)

FOREIGN PATENT DOCUMENTS

CN    1289392 A    3/2001
CN    1573126 A    2/2005
(Continued)

OTHER PUBLICATIONS

Extended European Search Report issued Apr. 8, 2015 in Patent Application No. 12790079.3.
(Continued)

*Primary Examiner* — Thomas E Lazo
*Assistant Examiner* — Daniel Collins
(74) *Attorney, Agent, or Firm* — Oblon, McClelland, Maier & Neustadt, L.L.P.

(57) ABSTRACT

A slewing-type working machine includes: a slewing motor which is a hydraulic motor for slewing; a variable-displacement hydraulic pump; a slewing operation device including an operation member; a control valve controlling the slewing motor based on an operation signal thereof; a pump regulator; a relief valve letting excess fluid to a tank; operation detectors detecting an operation direction and amount of the operation member; a motor rotational speed detector; and a controller controlling a discharge flow rate of the hydraulic pump. The controller obtains a deviation between a target rotational speed of the slewing motor obtained from a slewing operation amount and an actual
(Continued)

rotational speed detected by the motor rotational speed detector, and controls the discharge flow rate to make the deviation closer to 0.

2 Claims, 6 Drawing Sheets

(51) Int. Cl.
*E02F 9/12* (2006.01)
*G05B 11/14* (2006.01)
*F15B 9/03* (2006.01)
*F15B 9/14* (2006.01)

(52) U.S. Cl.
CPC ............ *E02F 9/2285* (2013.01); *G05B 11/14* (2013.01); *F15B 9/03* (2013.01); *F15B 9/14* (2013.01); *G05B 2219/45012* (2013.01); *Y10T 137/86027* (2015.04)

(58) Field of Classification Search
USPC ............................................................ 60/445
See application file for complete search history.

(56) References Cited

U.S. PATENT DOCUMENTS

| 5,941,155 | A | * | 8/1999 | Arai | ........................ E02F 9/123 |
| | | | | | 60/468 |
| 2004/0231326 | A1 | * | 11/2004 | Imanishi | ............... E02F 9/2225 |
| | | | | | 60/534 |
| 2011/0029206 | A1 | | 2/2011 | Kang et al. | |
| 2013/0213026 | A1 | * | 8/2013 | Yamamoto | ............. B66C 23/86 |
| | | | | | 60/327 |

FOREIGN PATENT DOCUMENTS

| CN | 1650123 A | 8/2005 | |
| EP | 0 567 698 A1 | 11/1993 | |
| JP | 7 45748 | 5/1995 | |
| JP | 8-198588 A | 8/1996 | |
| JP | 9-195322 A | 7/1997 | |
| JP | 3352837 | 9/2002 | |
| JP | 2004 225867 | 8/2004 | |
| JP | 3582679 | 8/2004 | |
| JP | 2012 127154 | 7/2012 | |
| WO | WO2010150846 A1 * | 12/2010 | ................ E02F 9/20 |

OTHER PUBLICATIONS

Combined Chinese Office Action and Search Report issued Feb. 2, 2015 in Patent Application No. 201280025372.9 (with an English Summary and English Translation of Category of Cited Documents).

International Search Report Issued Aug. 7, 2012 in PCT/JP12/003095 Filed May 11, 2012.

English Translation of Written Opinion Issued Aug. 7, 2012 in PCT/JP12/003095 Filed May 11, 2012.

* cited by examiner

SLEWING-TYPE WORKING MACHINE

TECHNICAL FIELD

The present invention relates to a slewing-type working machine such as an excavator or the like.

BACKGROUND ART

The background art of the present invention is now explained taking an excavator as an example.

Figure 6:
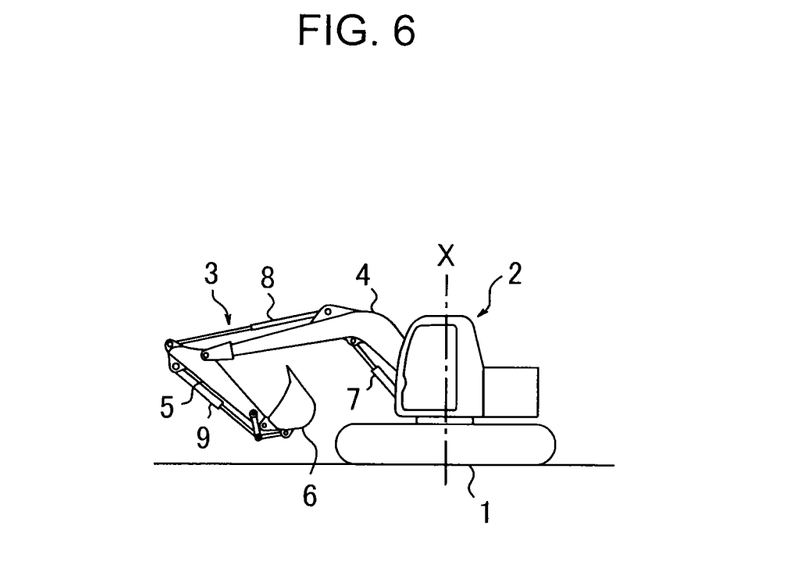
FIG. 6 is a side view showing a general excavator.

A general excavator includes, for example, as shown in FIG. 6, a crawler-type base carrier 1, an upper slewing body 2 mounted thereon so as to be capable of being slewed about an X axis that is perpendicular to the ground, and an excavating attachment 3 which is attached to the upper slewing body 2. The excavating attachment 3 includes a boom 4 capable of being raised and lowered, an arm 5 mounted at the tip of the boom 4, a bucket 6 mounted at the tip of the arm 5, and respective cylinders (hydraulic cylinders) for moving the boom 4, the arm 5 and the bucket 6, namely, a boom cylinder 7, an arm cylinder 8 and a bucket cylinder 9. As hydraulic actuators other than the cylinders 7 to 9, further provided are left and right travel motors for driving the left and right crawlers of the base carrier 1, and a slewing motor configured from a hydraulic motor for driving the upper slewing body 2 to slew it.

In order to operate the actuators, used are a hydraulic pump as a hydraulic power source thereof, a remote control valve as a operation device, and a control valve which is operated so as to control supply of hydraulic fluid from the hydraulic pump to the actuators and discharging the hydraulic fluid from the actuators, based on the operation applied to the operation device; these control the operating direction and the operating speed of the actuators. With respect to the respective actuators, build are respective actuator circuits, each of which is provided with a main relief valve (hereinafter simply referred to as the "relief valve") between the pump discharge pipe-line and the tank to prevent the circuit piping and equipment from being damaged due to high pressure, the main relief valve being adapted to be opened when the circuit pressure exceeds the relief pressure to let the hydraulic fluid to the tank.

With regard to the slewing circuit for driving the slewing motor, of the actuator circuits, a variable displacement pump is used as the hydraulic pump, and so-called positive control of increasing the discharge flow rate of the pump (hereinafter referred to as the "pump flow rate") with increase in the amount of the operation applied to the remote control valve (hereinafter referred to as the "slewing operation amount") is adopted from time to time. In the foregoing case, the difference between the pump flow rate determined based on the slewing operation amount and the motor flow rate actually used in the rotation of the slewing motor, i.e., the slewing flow rate, corresponds to an excess flow rate which is the flow rate of the hydraulic fluid to be let from the relief valve to the tank, and the energy efficiency of the hydraulic pump is inferior as the excess flow rate, i.e., the relief flow rate, is greater.

In order to inhibit the excess flow rate, there is conventionally known an art of estimating the relief flow rate from the pump pressure during slewing and the pressure characteristics of the relief valve, and controlling the pump flow rate so as to make the estimated value be 0, as described in Patent Document 1. According to the art of thus "estimating" the relief flow rate, i.e., the excess flow rate, based on the pressure characteristics of the relief valve as described above, it is difficult to obtain a highly accurate estimated value, because the pressure characteristics itself, which are used as the grounds for estimation, will vary due to the variation in the respective relief valves or the variation caused by temperatures. This may lead to the deterioration in the work efficiency caused by the insufficient slew speed associated with the insufficient flow rate, or contrarily lead to the deterioration in the power conservation effect caused by the increase in the excess flow rate associated with the excessive flow rate.

Patent Document 1: Japanese Patent Application Publication No. 2004-225867

SUMMARY OF THE INVENTION

An object of this invention is to provide a slewing-type working machine capable of accurately obtaining the excess flow rate to appropriately performing the flow rate control of the hydraulic pump for driving for slewing. The slewing-type working machine provided by the present invention includes: a base carrier; an upper slewing body mounted on the base carrier so as to be capable of being slewed; a slewing motor which is a hydraulic motor adapted to be operated by receiving supply of hydraulic fluid to drive the upper slewing body to slew it; a variable-displacement-type hydraulic pump for supplying the hydraulic fluid to the hydraulic motor; a pump regulator which varies a discharge flow rate of the hydraulic pump; a slewing operation device including an operation member to which an operation is applied to input a command regarding the driving for slewing, the operation device adapted to output an operation signal corresponding to the operation applied to the operation member; a control valve which is operated to control supply of the hydraulic fluid to the hydraulic motor and discharge of the hydraulic fluid from the hydraulic motor, based on the operation signal of the slewing operation device; a relief valve which returns, to a tank, the excess of the hydraulic fluid discharged from the hydraulic pump; an operation detector which detects a direction and an amount of the operation applied to the operation member of the slewing operation device; a motor-rotational-speed detector for detecting a rotational speed of the slewing motor, and a controller which commands the discharge flow rate of the hydraulic pump to the pump regulator, wherein the controller obtains a deviation between a target rotational speed of the slewing motor obtained from the amount of the operation applied to the operation member of the slewing operation device and an actual rotational speed of the slewing motor detected by the motor rotational speed detector, that is, a value corresponding to an excess flow rate which is a flow rate of the excess hydraulic fluid, and controls the discharge flow rate of the hydraulic pump so as to make the deviation closer to 0.

EMBODIMENT FOR CARRYING OUT THE INVENTION

An embodiment of the present invention is now explained. As with the section of Background Art described above, this embodiment can be applied to the excavator shown in FIG. 6.

Figure 1:
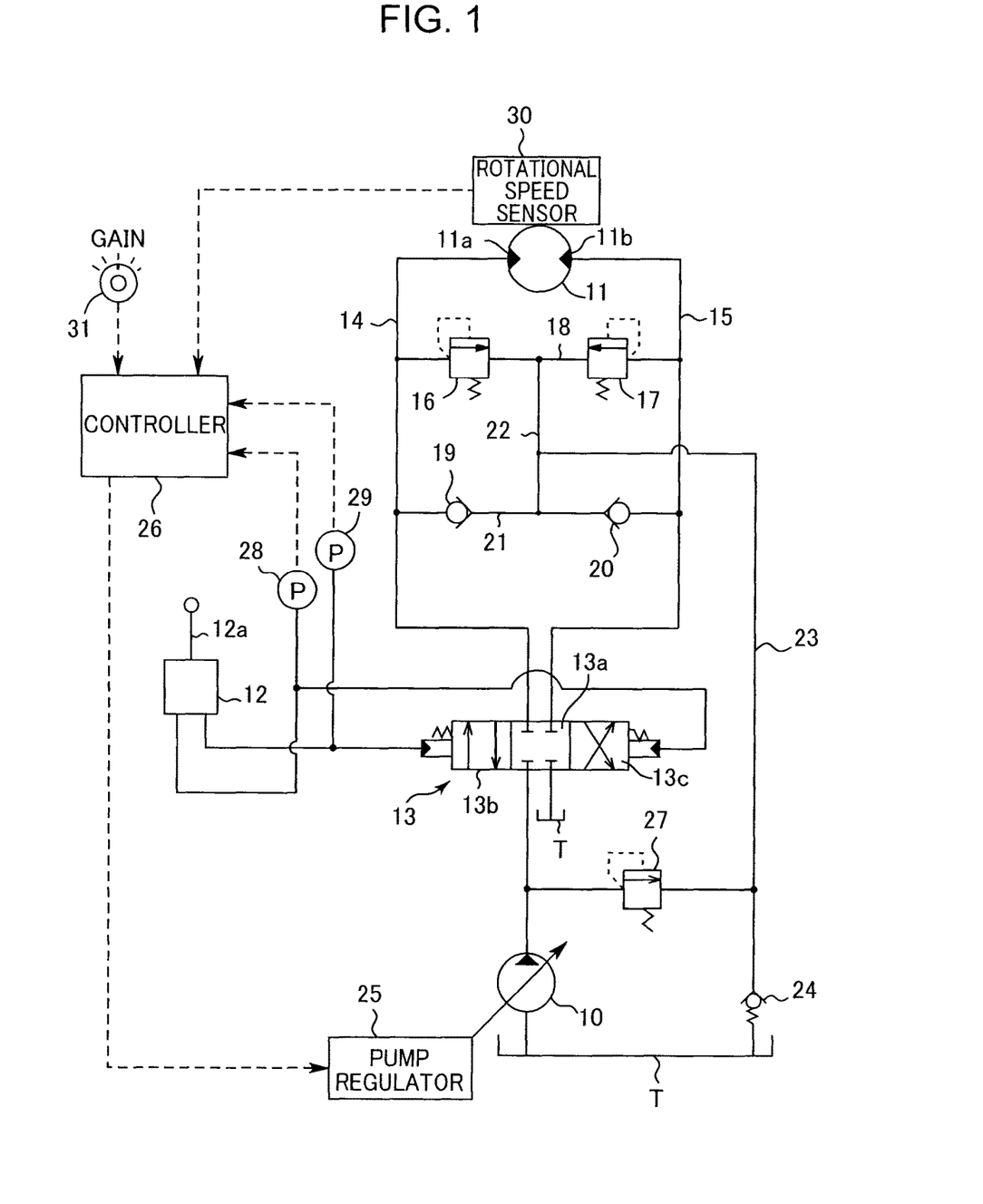
FIG. 1 is a diagram showing the slewing circuit according to an embodiment of the present invention.

FIG. 1 shows a slewing circuit according to an embodiment of the present invention; that is, a circuit for driving the upper slewing body 2 shown in FIG. 6 to slew it. This circuit includes: a hydraulic pump 10 as a hydraulic power source that is driven by an engine not shown; a slewing motor 11 which is a hydraulic motor for slewing, the slewing motor adapted to be rotated by supply of hydraulic fluid discharged from the hydraulic pump 10 to drive the upper slewing body 2 to slew it; a remote control valve 12 as a slewing operation device including a lever 12a to which an operation is applied to input commands of the driving for slewing; and a control valve 13 which is a hydraulic pilot-controlled selector valve capable of being operated by the remote control valve 12, the control valve 13 being provided between a pair of the hydraulic pump 10 and tank T and the slewing motor 11.

The slewing motor 11 includes a left port 11a and a right port 11b as respective first and second ports. When supplied with the hydraulic fluid through the left port 11a, the slewing motor 11 discharges the hydraulic fluid through the right port 11b to slew the upper slewing body 2 leftward as shown in FIG. 6; when supplied with the hydraulic fluid through the right port 11b, the slewing motor 11 discharges the hydraulic fluid through the left port 11a to slew the upper slewing body 2 rightward.

The level 12a of the remote control valve 12 is operated between a neutral position and left/right turning positions, and the remote control valve 12 outputs pilot pressure with a magnitude corresponding to the amount of the operation from the port corresponding to the direction of the operation. By the pilot pressure, the control valve 13 is switched from the graphically shown neutral position 13a to a left slewing position 13b or a right slewing position 13c, thereby controlling the supply direction of the hydraulic fluid to the slewing motor 11, the left/right discharge directions from the slewing motor 11, and the flow rate of the hydraulic fluid; in other words, performed are: the switching of the slewing state, namely, switching between acceleration (including startup), normal operation at a constant speed, deceleration, and stop; and control of the slewing direction and slew speed.

This circuit includes: a left slewing pipe-line 14 and a right slewing pipe-line 15 which are a first pipe-line and a second pipe-line, respectively; a relief valve circuit 18; a check valve circuit 21; a communication passage 22; a makeup line 23; and a main relief valve 27 for restricting the circuit pressure to a setting value or less.

The left slewing pipe-line 14 connects the control valve 13 to the left port 11a of the slewing motor 11, and the right slewing pipe-line 15 connects the control valve 13 to the right port 11b of the slewing motor 11. The relief valve circuit 18, the check valve circuit 21, and the communication passage 22 are disposed between the slewing pipe-lines 14, 15.

The relief valve circuit 18 is provided so as to interconnect the slewing pipe-lines 14, 15. The relief valve circuit 18 includes a pair of relief valves 16, 17 corresponding to respective brake valves and having respective outlets opposed and connected to each other.

The check valve circuit 21 is provided in parallel with the relief valve circuit 18 so as to interconnect the slewing pipe-lines 14, 15 at a position closer to the slewing motor 11 than the relief valve circuit 18. The check valve circuit 21 includes a pair of check valves 19, 20 having respective inlets opposed and connected to each other.

The communication passage 22 connects a first portion of the relief valve circuit 18, the first portion located between the relief valves 16, 17, to a second portion of the check valve circuit 21, the second portion located between both check valves 19, 20. The makeup line 23 connects the communication passage 22 to the tank T for pumping up the hydraulic fluid. The makeup line 23 is provided with a back pressure valve 24.

In this apparatus, when no operation is applied to the remote control valve 12, that is, when the lever 12a is in a neutral position, the control valve 13 is retained at the neutral position 13a shown in FIG. 1. When an operation is applied to the lever 12a from the foregoing state, the control valve 13 is operated from the neutral position 13a to the left-side position (left slewing position) 13b or the right-side position (right slewing position) 13c in the diagram in a stroke corresponding to the amount of the applied operation.

The control valve 13, in the neutral position 13a, blocks both of the slewing pipe-lines 14, 15 from the pump 10, preventing the slewing motor 11 from rotation. When an operation is applied to the lever 12a of the remote control valve 12 to the leftward or rightward slewing side from the foregoing state, the control valve 13 is switched to the left slewing position 13b or the right slewing position 13c to allow the hydraulic fluid to be supplied from the hydraulic pump 10 to the left slewing pipe-line 14 or the right slewing pipe-line 15. This brings a state where the slewing motor 11 is rotated leftward or rightward to drive the upper slewing body 2 to slew it, namely, an acceleration state or normal operation state. Here, the hydraulic fluid discharged from the slewing motor 11 is returned to the tank T via the control valve 13. When the circuit pressure exceeds the setting value during the slewing operation, the main relief valve 27 is opened to return the excess hydraulic fluid to the tank T.

On the other hand, upon operation applied to the remote control valve 12 for deceleration, for example, during the rightward slewing drive, specifically, upon returning the lever 12a to the neutral position or upon operation applied to the lever 12a in a direction of returning to the neutral position, the supply of the hydraulic fluid to the slewing motor 11 and the return of the fluid from the slewing motor 11 to the tank T are stopped, or the flow rate of thus supplied hydraulic fluid and the flow rate of the return fluid are reduced. Meanwhile, the slewing motor 11 continues rotating rightward due to the inertia of the upper slewing body 2, which raised the pressure in the left slewing pipe-line 14 on the meter-out side; when the raised pressure reaches a constant value, the relief valve 16 on the left side of the diagram is opened and the fluid in the left slewing pipe-line 14 flows into the slewing motor 11 passing through the relief valve 16, the communication passage 22, the check valve 20 on the right side of the diagram, and the right slewing pipe-line (meter-in-side pipe-line) 15 as shown with the broken line arrow of FIG. 1. The slewing motor 11, while rotating based on inertia, is thereby subject to the hydraulic braking force due to the relief action to be thus decelerated and stopped. Decelerating and stopping the leftward slewing are similarly performed. Besides, when the slewing pipe-line 14 or 15 is subjected to negative pressure during the deceleration, the hydraulic fluid in the tank T is sucked up into the slewing pipe-line 14 or 15 in the course of the make-up line 23, the communication path 22 and the check valve circuit 21 in this order, thereby preventing cavitation.

The hydraulic pump 10 is a variable-displacement hydraulic pump having a variable tilt angle, which is varied involving a variation in the discharge flow rate. The circuit according to this embodiment further includes: a pump regulator 25 which varies the tilt angle of the hydraulic pump 10 and the discharge flow rate, which is the flow rate of the discharged hydraulic fluid; a controller 26 which controls the discharge flow rate of the hydraulic pump 10 by inputting a flow rate command to the pump regulator 25; pilot pressure sensors 28, 29 as respective operation detectors; a rotational speed sensor 30 as a motor speed detector; and a gain regulator 31.

Each of the pilot pressure sensors 28, 29 detects the pilot pressure output from the remote control valve 12 as the slewing operation amount, and outputs an operation detection signal corresponding to the pilot pressure. The rotational speed sensor 30 detects the rotational speed of the slewing motor 11 and outputs a rotational speed detection signal corresponding to the detected rotational speed.

The controller 26 computes the required pump flow rate, i.e., the discharge flow rate of the hydraulic pump 10, and the pump tilt angle for obtaining that pump flow rate based on the operation detection signal input from the pilot pressure sensors 28, 29 and the rotational speed detection signal input from the rotational speed sensor 30, and commands the pump regulator 25 to adjust the actual tilt angle to the computed pump tilt angle.

The gain regulator 31 is operated to allow an operator to arbitrarily change, also manually, the gain (proportionality constant) which is set by the controller 26 to compute the pump flow rate, and inputs a gain regulation signal corresponding to the operation to the controller 26.

Figure 2:
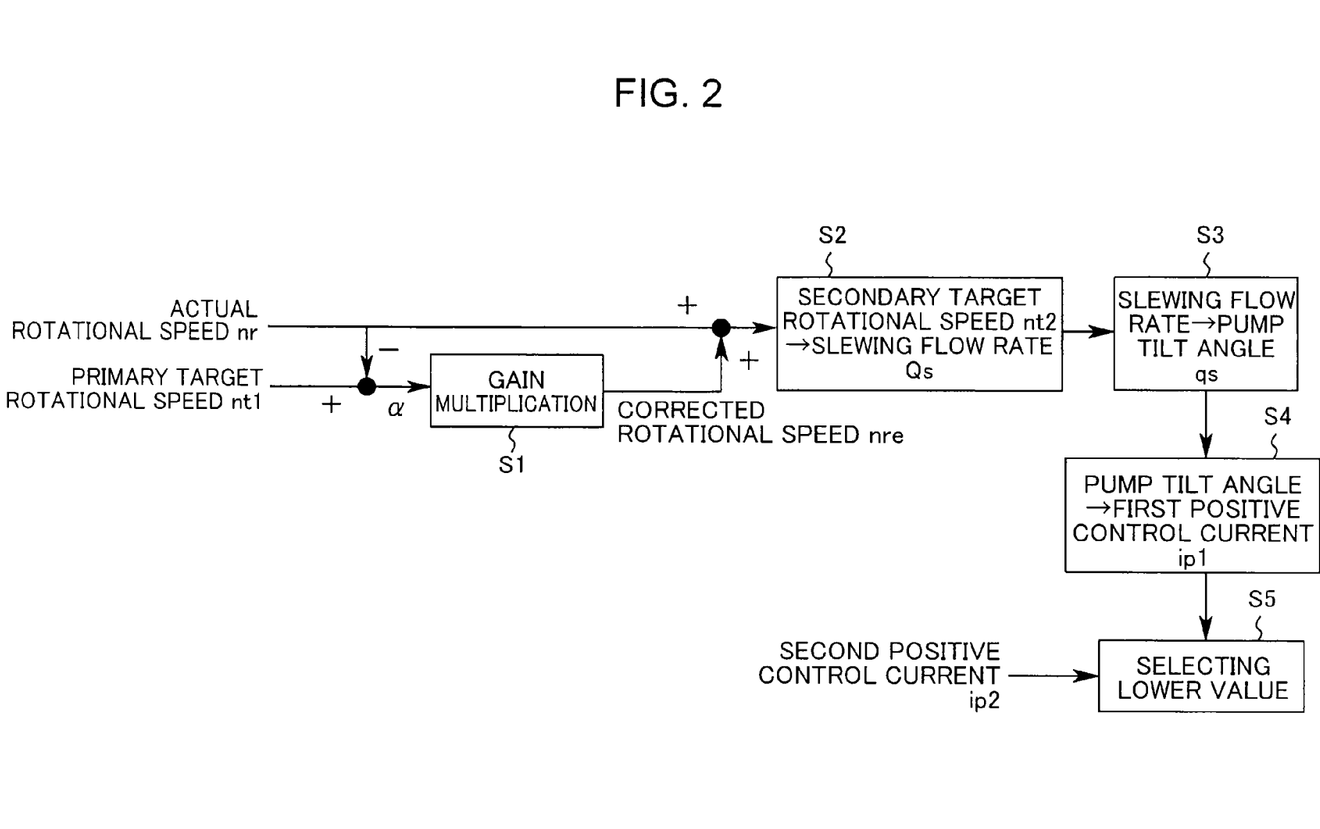
FIG. 2 is a block diagram showing the contents of the arithmetic control performed by the controller according to the embodiment.

Next will be explained the specific control operation performed by the controller 26, with reference to the block diagram of FIG. 2.

Figure 3:
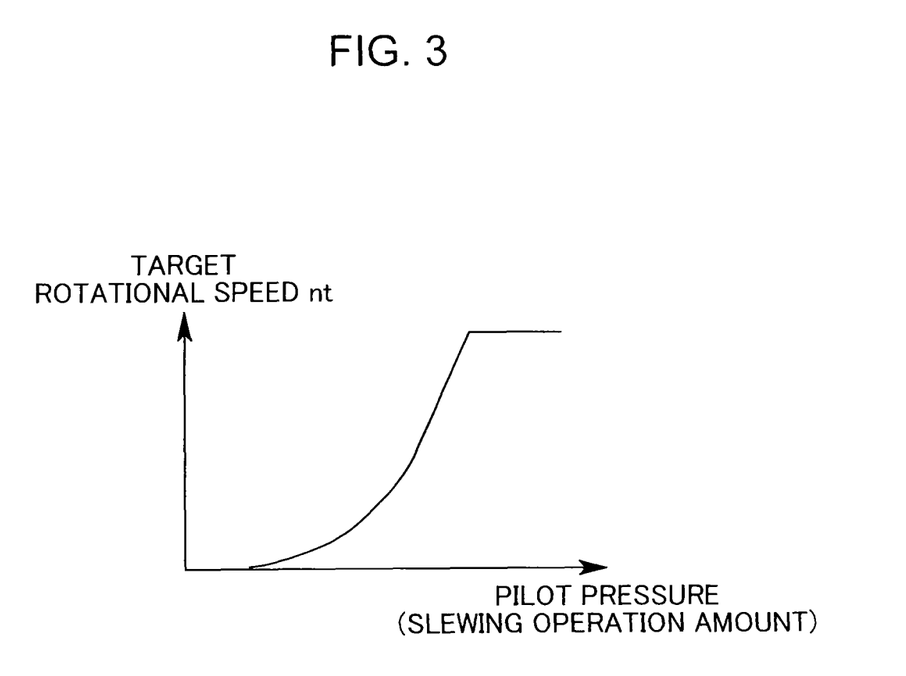
FIG. 3 is a diagram showing the relation of the slewing operation amount and the target rotational speed in the embodiment.

With regard to the slewing circuit, the controller 26 basically performs positive control. Specifically, the controller 26 foremost obtains a primary target rotational speed nt1, which is the target rotational speed of the slewing motor 11 according to the slewing operation amount, from the characteristics of the pilot pressure (slewing operation amount)/target rotational speed set in advance as shown in FIG. 3, and compares it with the actual rotational speed nr as the actual rotational speed of the slewing motor 11 detected by the rotational speed sensor 30. In other words, the controller 26 obtains the deviation α between the target rotational speed nt1 and the actual rotational speed nr, and, in step S1, multiplies the deviation α by the gain to thus calculate the corrected rotational speed nre.

The reason for multiplying the deviation α by the gain is explained with reference to FIG. 4. The graph on the left side of FIG. 4 shows a case when the slewing operation amount is great and the graph on the right side of FIG. 4 shows a case when the slewing operation amount is small, the top graph shows the time change of the pilot pressure, the second graph from the top shows the time change of the primary target rotational speed nt1 and the actual rotational speed nr, the third graph from the top shows the time change of the gain, and the bottom graph shows the time change of the pump flow rate.

Figure 4:
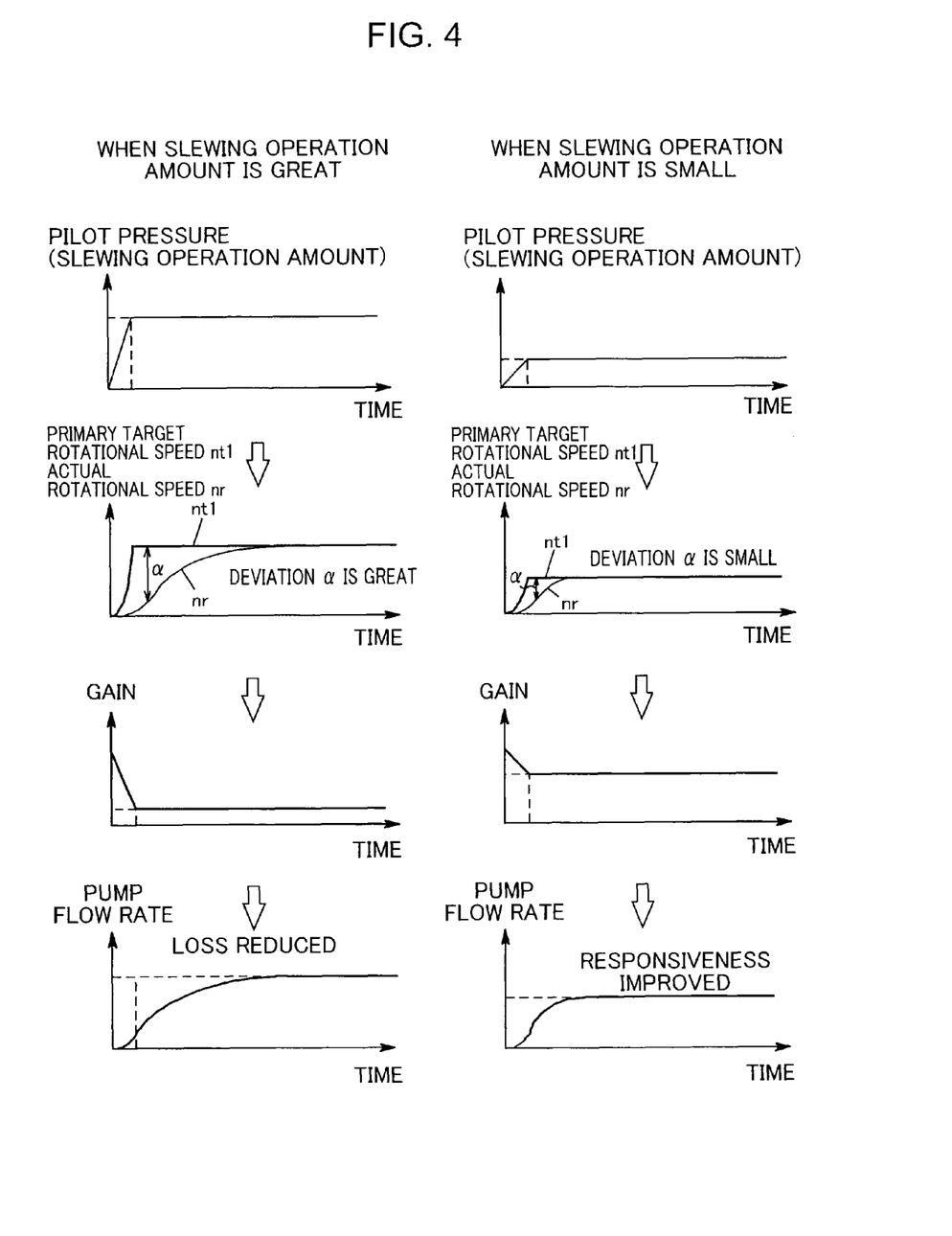
FIG. 4 is a diagram for explanation of varying the gain in accordance with the level of the slewing operation amount in the embodiment.

As shown in the top graph of FIG. 4, the value and rise angle of the pilot pressure output by the remote control valve 12 differ depending on the level of the slewing operation amount. Consequently, as shown in the second graph from the top, the deviation α between the initial primary target rotational speed nt1 and the actual rotational speed nt1 will increase as the slewing operation amount is greater. Thus, in normal positive control, in the case of great slewing operation, the pump flow rate will increase drastically and cause the excess flow rate to increase, while, in the case of small slewing operation amount, the followability of the pump flow rate will deteriorate.

Accordingly, as shown in the third graph from the top in FIG. 4, lowering the gain to lower the pump flow rate in the case of the great slewing operation amount and increasing the gain to increase the pump flow rate in the case of the small slewing operation amount makes it possible, as shown in the bottom graph, to suppress the generation of an excess flow rate to reduce the energy loss in the case of the slewing operation amount, and to improve the followability of the pump flow rate; that is, the responsiveness of the actuator, in the case of the small slewing operation. While the magnitude of the gain is automatically set by the controller 26 in accordance with level of the slewing operation amount, the operator, in this embodiment, can also manually operate the gain regulator 31 and select or change the gain according to the operator's preference or usage.

In subsequent step S2, the controller 26 adds the corrected rotational speed nre to the actual rotational speed nr to obtain a secondary target rotational speed nt2, and further obtains a motor flow rate (slewing flow rate) Qs for obtaining the target secondary rotational speed nt2.

In subsequent step S3, the controller 26 obtains a pump tilt angle qs for obtaining the slewing flow rate Qs, and, in step S4, further obtains a first positive control current ip1, which is the current to be supplied from the controller 26 to the pump regulator 25, in order to realize the pump tilt angle qs.

Meanwhile, the controller 26 separately calculates a second positive control current ip2 by sequentially computing the pump flow rate→slewing flow rate→pump tilt angle in order to realize the primary target rotational speed nr1 based on the primary target rotational speed nr1, which is the target rotational speed that is determined only based on the slewing operation amount, and, in step S5, performs selecting a lower value between the first positive control current ip1 and the second positive control current ip2.

Figure 5:
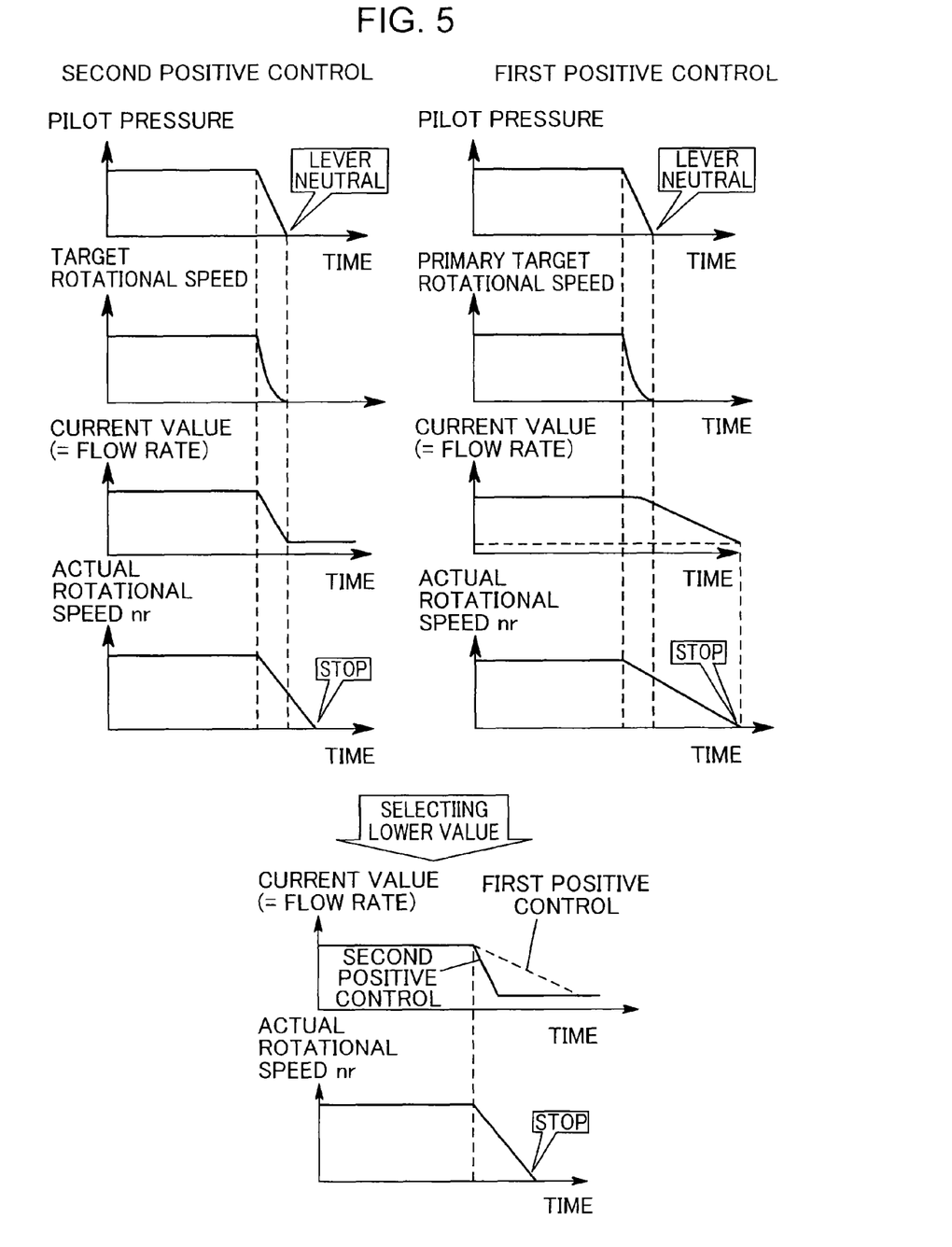
FIG. 5 is a diagram for explanation of selecting a lower value between the current value based on the second positive control and the current value based on the first positive control in the embodiment.

The significance of the selection of a lower value is now explained with reference to FIG. 5, which shows the transition of the pilot pressure, the target rotational speed, the current value, and the actual rotational speed during the deceleration/stop of the slewing operation. In FIG. 5, "first positive control" refers to the control that is unique to the present invention of multiplying the deviation α by the gain, and "second positive control" refers to the control of determining the target rotational speed only based on the slewing operation amount, which has been performed conventionally. The upper left graph in FIG. 5 relates to the second positive control, while the right graph relates to the first positive control.

Upon returning the lever 12a of the remote control valve 12 to the neutral position from the left slewing position or the right slewing position during slewing of the upper slewing body 2, the target rotational speed and the positive control current start decreasing, thereby gradually decreasing the actual rotational speed nr and resulting in the stop of slewing. Here, with the second positive control, the positive control current will have been minimized at the time when the lever 12a reaches the neutral position, and the slewing of the upper slewing body 2 is stopped with a minimal time-lag from that point in time; meanwhile, with the first positive control, which includes the feedback of the actual rotational speed, more time than the second positive control is required for the reduction in the current value and the actual rotational speed nr, and the stoppage of rotation is thereby delayed. Hence, in the foregoing case, selecting the value of the second positive control current ip2 which value is lower than the value of the first positive control current ip1 enables the actual rotational speed nr to be promptly reduced to stop the slewing as shown in the bottom graph of FIG. 5. Contrarily, during acceleration including startup, selecting the relatively lower value, namely the value of the first positive control current ip1, makes it possible to reduce excess flow rate.

Thus, according to the slewing system of this embodiment, calculating the deviation $\alpha$ between the primary target rotational speed nt1 as the target rotational speed of the slewing motor 11 according to the slewing operation amount and the detected actual rotational speed nr, that is, calculating a value corresponding to the excess flow rate, and controlling the pump flow rate so as to make the calculated deviation $\alpha$ close to 0 enables an appropriate flow rate control based on an accurate excess flow rate in comparison to the conventional technology which performs the control of the pump flow rate based on an estimated value of the relief flow rate to be performed, thereby making it possible to inhibit the excess flow rate during the slewing operation to increase the energy efficiency.

Besides, the controller 26 according to this embodiment, obtaining the corrected rotational speed nre by multiplying the deviation $\alpha$ between the primary target rotational speed nt1 and the actual rotational speed nr obtained from the slewing operation amount by a gain which is reduced as the slewing operation amount is greater, and obtaining the slewing flow rate Qs of the hydraulic fluid to be supplied to the slewing motor 11 based on the secondary target rotational speed nt2 which is determined based on the sum of the corrected rotational speed nre and the actual rotational speed nr, makes it possible to, during acceleration including startup, reduce the excess flow rate by suppressing the increase in the pump flow rate in the case of great slewing operation amount while improve the speed followability in the case of small slewing operation amount.

Furthermore, selecting the lower value between the value of the first positive control current ip1 and the value of the second positive control current ip2 enables both of the acquisition of a high power conservation effect during acceleration and high responsiveness during deceleration/stoppage to be realized, as described above. The present invention, however, also includes a mode lacking in selecting a lower value, where it is also possible to achieve the basic object of the present invention, that is, accurately obtaining the excess flow rate.

The slewing-type working machine according to the present invention is not limited to an excavator. For example, the present invention can also be applied to other slewing-type working machines such as a demolishing machine or a crushing machine that is configured by using a mother body of an excavator.

As described above, according to the present invention, provided is a slewing-type working machine capable of accurately obtaining the excess flow rate and appropriately performing the flow rate control of the hydraulic pump for revolvable drive. The slewing-type working machine includes: a base carrier; an upper slewing body mounted on the base carrier so as to be capable of being slewed; a slewing motor which is a hydraulic motor adapted to be operated by receiving supply of hydraulic fluid to drive the upper slewing body to slew it; a variable-displacement-type hydraulic pump for supplying the hydraulic fluid to the hydraulic motor; a pump regulator which varies a discharge flow rate of the hydraulic pump; a slewing operation device including an operation member to which an operation is applied to input a command regarding the driving for slewing, the operation device adapted to output an operation signal corresponding to the operation applied to the operation member; a control valve which is operated to control supply of the hydraulic fluid to the hydraulic motor and discharge of the hydraulic fluid from the hydraulic motor, based on the operation signal of the slewing operation device; a relief valve which returns, to a tank, the excess of the hydraulic fluid discharged from the hydraulic pump; an operation detector which detects a direction and an amount of the operation applied to the operation member of the slewing operation device; a motor-rotational-speed detector for detecting a rotational speed of the slewing motor, and a controller which commands the discharge flow rate of the hydraulic pump to the pump regulator, wherein the controller obtains a deviation between a target rotational speed of the slewing motor obtained from the amount of the operation applied to the operation member of the slewing operation device and an actual rotational speed of the slewing motor detected by the motor rotational speed detector, that is, a value corresponding to an excess flow rate which is a flow rate of the excess hydraulic fluid, and controls the discharge flow rate of the hydraulic pump so as to make the deviation closer to 0.

In other words, the controller includes a deviation calculation section which calculates a deviation between the target rotational speed and the actual rotational speed, or a value corresponding thereto, and a discharge flow rate control section which controls the discharge flow rate of the hydraulic pump to make the calculated value closer to 0. Thus calculating the deviation between the target rotational speed of the slewing motor according to the slewing operation amount and the detected actual rotational speed, i.e., a value corresponding to the excess flow rate, and controlling the pump flow rate control to make the calculated deviation one closer to 0 enables an appropriate flow rate control based on an accurate excess flow rate to be performed, in comparison to the conventional technology of performing the control of the pump flow rate based on an estimated value of the relief flow rate. This makes it possible to inhibit the excess flow rate during the slewing operation to enhance the energy efficiency.

The controller, more preferably, performs: determining a gain which is decreased as a slewing operation amount, which is the operation amount of the operation member of the slewing operation device, is greater; obtaining a corrected rotational speed by multiplying the deviation between a primary target rotation, which is the target rotational speed obtained from the slewing operation amount, and the actual rotational speed by the gain; obtaining a slewing flow rate of the hydraulic fluid to be supplied to the slewing motor from a secondary target rotational speed which is determined based on a sum of the corrected rotational speed and the actual rotational speed; and controlling the discharge flow rate of the hydraulic pump so as to attain the slewing flow rate. To put it differently, the discharge flow rate control section includes: a gain setting portion adapted to set a smaller gain as the slewing operation amount, which is the operation amount of the operation member of the slewing operation device, is greater; a corrected rotational speed determination portion adapted to obtain a corrected rotational speed by multiplying the deviation between a primary target rotation, which is the target rotational speed obtained from the slewing operation amount, and the actual rotational speed by the gain; a slewing flow rate determination portion adapted to obtain the slewing flow rate of the hydraulic fluid to be supplied to the slewing motor from a secondary target rotational speed which is determined based on a sum of the corrected rotational speed and the actual rotational speed; and a discharge flow rate adjustment portion adapted to adjust the discharge flow rate of the hydraulic pump based on the slewing flow rate determination portion.

The arithmetic control thus including setting the gain based on the slewing operation amount as described above makes it possible to obtain appropriate flow rate characteristics according to the slewing operation amount. Specifically, particularly during the acceleration of rotation including cases of startup, in which the deviation is increased as the slewing operation amount is greater and consequently increase the excess flow rate, inhibiting the increase in the pump flow rate by multiplying the deviation by a smaller gain as the slewing operation amount is greater allows the excess flow rate to be reduced, while, in the case of small slewing operation amount, in which the speed change of the motor is likely to be late with respect to the increase in the pump flow rate, using a greater gain allows the speed followability to be improved.

It is preferable that the controller performs selecting a lower value between a first value obtained based on the operation amount of the operation member of the slewing operation device and the deviation and a second value which is determined based only on the operation amount of the operation member of the slewing operation device, as a value corresponding to the discharge flow rate of the hydraulic pump, and controls the discharge flow rate of the hydraulic pump with the selected value as a target. This enables appropriate flow rate control in accordance with the acceleration, deceleration and stop of the slewing operation to be performed. Specifically, during the acceleration of the slewing operation, selecting the first value based on the feedback control to make the deviation closer to 0 promptly brings the excess flow rate into 0, thus allowing a high power conservation effect to be obtained, while, during the deceleration or stop of the slewing operation, selecting the second value based on the positive control according to the slewing operation amount (because the pump flow rate 0 is achieved at operation amount 0) makes it possible to stop the slewing of the upper slewing body more quickly, that is, enhance the responsiveness of stopping the slewing operation, in comparison to the conventional control of causing the pump flow rate to be continued until the actual rotational speed of the slewing motor reaches 0, that is, the control based on the first value.

The invention claimed is:

1. A slewing-type working machine, comprising:
a base carrier;
an upper slewing body mounted on the base carrier so as to be capable of being slewed;
a slewing motor which is a hydraulic motor adapted to be operated by receiving supply of hydraulic fluid to drive the upper slewing body to slew the upper slewing body;
a variable-displacement-type hydraulic pump which supplies the hydraulic fluid to the hydraulic motor;
a pump regulator which varies a discharge flow rate of the hydraulic pump;
a slewing operation device including an operation member to which an operation is applied to input a command regarding the driving for slewing, the operation device adapted to output an operation signal corresponding to the operation applied to the operation member;
a control valve which is operated to control supply of the hydraulic fluid to the hydraulic motor and discharge of the hydraulic fluid from the hydraulic motor, based on the operation signal of the slewing operation device;
a relief valve which returns, to a tank, the excess of the hydraulic fluid discharged from the hydraulic pump;
an operation detector which detects a direction and an amount of the operation applied to the operation member of the slewing operation device;
a motor-rotational-speed detector which detects a rotational speed of the slewing motor; and
a controller which commands the discharge flow rate of the hydraulic pump to the pump regulator, wherein the controller obtains a deviation between a target rotational speed of the slewing motor obtained from the amount of the operation applied to the operation member of the slewing operation device and an actual rotational speed of the slewing motor detected by the motor rotational speed detector, that is, a value corresponding to an excess flow rate which is a flow rate of the excess hydraulic fluid, and controls the discharge flow rate of the hydraulic pump so as to make the deviation closer to 0,
wherein the controller performs: determining a smaller gain as a slewing operation amount, which is the operation amount of the operation member of the slewing operation device, is greater; obtaining a corrected rotational speed by multiplying the deviation between a primary target rotation, which is the target rotational speed obtained from the slewing operation amount, and the actual rotational speed by the gain; obtaining a slewing flow rate of the hydraulic fluid to be supplied to the slewing motor from a secondary target rotational speed which is determined based on a sum of the corrected rotational speed and the actual rotational speed; and controlling the discharge flow rate of the hydraulic pump so as to attain the slewing flow rate.

2. A slewing-type working machine, comprising:
a base carrier;
an upper slewing body mounted on the base carrier so as to be capable of being slewed;
a slewing motor which is a hydraulic motor adapted to be operated by receiving supply of hydraulic fluid to drive the upper slewing body to slew the upper slewing body;
a variable-displacement-type hydraulic pump which supplies the hydraulic fluid to the hydraulic motor;
a pump regulator which varies a discharge flow rate of the hydraulic pump;
a slewing operation device including an operation member to which an operation is applied to input a command regarding the driving for slewing, the operation device adapted to output an operation signal corresponding to the operation applied to the operation member;
a control valve which is operated to control supply of the hydraulic fluid to the hydraulic motor and discharge of the hydraulic fluid from the hydraulic motor, based on the operation signal of the slewing operation device;
a relief valve which returns, to a tank, the excess of the hydraulic fluid discharged from the hydraulic pump;

an operation detector which detects a direction and an amount of the operation applied to the operation member of the slewing operation device;

a motor-rotational-speed detector which detects a rotational speed of the slewing motor; and a controller which commands the discharge flow rate of the hydraulic pump to the pump regulator, wherein the controller obtains a deviation between a target rotational speed of the slewing motor obtained from the amount of the operation applied to the operation member of the slewing operation device and an actual rotational speed of the slewing motor detected by the motor rotational speed detector, that is, a value corresponding to an excess flow rate which is a flow rate of the excess hydraulic fluid, and controls the discharge flow rate of the hydraulic pump so as to make the deviation closer to 0, wherein the controller performs selecting a lower value between a first value obtained based on the operation amount of the operation member of the slewing operation device and the deviation and a second value which is determined based only on the operation amount of the operation member of the slewing operation device, as a value corresponding to the discharge flow rate of the hydraulic pump, and controls the discharge flow rate of the hydraulic pump with the selected value as a target.

* * * * *